United States Patent [19]

Freeman

[11] Patent Number: 4,519,582
[45] Date of Patent: May 28, 1985

[54] SEAL ASSEMBLY AND VALVE

[75] Inventor: John W. Freeman, Houston, Tex.

[73] Assignee: Seaboard Wellhead Control, Inc., Houston, Tex.

[21] Appl. No.: 428,669

[22] Filed: Sep. 30, 1982

Related U.S. Application Data

[62] Division of Ser. No. 174,821, Aug. 4, 1980, Pat. No. 4,376,526.

[51] Int. Cl.³ .............................................. F16K 3/02
[52] U.S. Cl. ................................... 251/328; 251/167; 251/360; 277/50; 277/166
[58] Field of Search .............. 251/316, 315, 327, 328, 251/167, 172, 195, 360, 361, 363; 277/50, 166

[56] References Cited

U.S. PATENT DOCUMENTS

| | | |
|---|---|---|
| 564,378 | 7/1896 | Jennings . |
| 1,874,405 | 8/1932 | Wood . |
| 2,925,247 | 2/1960 | Fletcher . |
| 2,931,394 | 4/1960 | Hamer . |
| 3,006,601 | 10/1961 | Anderson et al. . |
| 3,175,802 | 3/1965 | Bredtschneider . |
| 3,273,855 | 9/1966 | Wells . |
| 3,307,826 | 3/1967 | Lowrey . |
| 3,335,999 | 8/1967 | Lowrey . |
| 3,929,316 | 12/1975 | Guthrie . |
| 4,116,419 | 9/1978 | Diehl et al. . |

Primary Examiner—Arnold Rosenthal
Attorney, Agent, or Firm—Arnold, White & Durkee

[57] ABSTRACT

A seal assembly is disclosed in connection with a valve, preferably a sliding gate valve. The seal assembly includes a retaining ring having a surface contour complementary to that on a resilient, replaceable seal element, in order to positively hold the seal in position during use. The ring also includes a threaded portion that may be received in a threaded section either in the valve body or in a separate valve seat collar secured within the valve body. In one embodiment, the seal includes an annular metallic component having an annular groove, into which a resilient component is secured.

7 Claims, 6 Drawing Figures

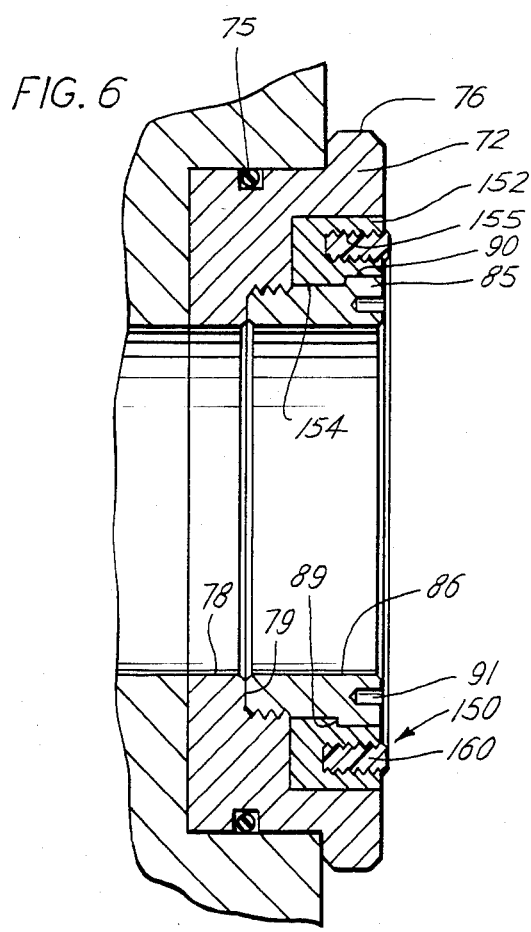

SEAL ASSEMBLY AND VALVE

This is a divisional application, Ser. No. 174,821, filed Aug. 4, 1980, now U.S. Pat. No. 4,376,526, issued Mar. 15, 1983.

BACKGROUND OF THE INVENTION

1. Field of the Invention

This invention relates generally to a seal and a valve, and more particularly to a seal assembly for use in gate valves.

2. The Prior Art

Typical current seals used in gate valves include a metallic valve seat that is press fit into a valve body. A resilient sealing element is force fit into the valve seat and held in position in an annular groove, which may include serrations. When the resilient seal element experiences wear, it is common to replace not only that element but the valve seat also, due to the difficulty in removing the seal element from the seat. Accordingly, this procedure is not only time consuming from the standpoint of removing the entire valve seat from the valve body, but is also unnecessarily expensive as a result of replacing two components in the assembly.

Various prior art efforts have been attempted to alleviate these problems. For example, U.S. Pat. No. 3,273,855 to Wells discloses sealing ring members which retain a resilient seal member in position in a gate valve assembly. However, the particular arrangement disclosed in this patent is not well suited for mid-range to high-range pressure operation. Also, the specific arrangement in Wells for maintaining the seal in position is difficult to machine and may not effectively hold the seal in place during the sliding movement of the gate element.

Other alternative sealing ring and seal arrangements are disclosed in U.S. Pat. Nos. 2,925,247 to Fletcher and 564,378 to Jennings, but these likewise include similar drawbacks as noted in connection with the Wells patent. Various other prior art attempts are disclosed in U.S. Pat. Nos. 3,175,802, to Bredtschneider, 3,929,316 to Guthrie, 4,116,419 to Diehl, 3,006,601 to Anderson, and 1,874,405 to Wood.

Accordingly, none of the prior art efforts have provided a valve seat and seal arrangement particularly suited for mid-range to high-range internal pressures, nor do they provide a structural relationship between the retaining ring and the seal for positively and effectively maintaining the seal in position during use.

SUMMARY OF THE INVENTION

The present invention overcomes the prior art shortcomings and disadvantages through a valve and seal assembly which includes a retaining ring and a resilient, replaceable seal element, both of which include complementary surface contours to positively hold the seal in position during use. The ring also includes a threaded portion that may be received in a threaded section either in the valve body or in a separate valve seat collar secured within the valve body. In one of the embodiments, the seal includes an annular metallic component having an annular groove, into which the resilient component is secured.

More particularly, in one embodiment the seal assembly includes an annular collar or valve seat body having an essentially cylindrical inner surface and first and second ends. The outer surface contour on the collar includes a first, essentially cylindrical section extending from its first end toward the second end and being suited for fitting into an annular recess in a valve body, preferably by press fitting. A second, essentially cylindrical section on the outer surface of the collar includes threads, and a third, essentially cylindrical section between the second section and the second end has an outer diameter less than that of the second section. An annular retainer cap is also included in this embodiment. An inner surface on the retainer cap includes a threaded section complementary to the threads on the second section of the collar to accommodate the cap being threaded onto the collar. Also on the retainer cap inner surface are a first essentially cylindrical section radially spaced from and facing a portion of the third section on the collar when the cap is threaded onto the collar, and a retaining surface between the threaded and essentially cylindrical sections. An annular sealing member is placed between the collar and the cap and includes a sealing end face and a contour complementary to the retaining surface on the cap.

In a more specific aspect of this embodiment, the first end on the collar has a greater outer diameter than its second end, and also the second section has an outer diameter less than that of the first section. Further, the retaining surface on the cap may include a second essentially cylindrical section extending from the threaded cap section and a radially inward step between the first and second essentially cylindrical sections. Likewise, the sealing member includes a peripheral flange to fit within the undercut formed by the step on the cap when the cap is threaded onto the collar, thereby positively locking the seal in position during use.

In a second embodiment, the seal assembly includes an annular collar with an essentially cylindrical outer surface section suited for fitting into an annular recess in a valve body, preferably by press fitting. The inner surface of the collar includes a first essentially cylindrical section, a second essentially cylindrical section having an inner diameter greater than that of the first section and having threads. A third essentially cylindrical section has an inner diameter greater than that of the second section with an essentially radial, annular surface being provided to interconnect the second and third sections. Also included in this embodiment is an annular retainer gland having an essentially cylindrical inner surface with substantially the same diameter as that of the first section of the collar. The outer gland surface includes a first section threaded complementary to the second collar section to accommodate the gland being threaded into the collar. Also provided are a second essentially cylindrical section adjacent the threaded section, a third essentially cylindrical section radially spaced from and facing the third section of the collar when the gland is threaded into the collar, and a radial outward, annular step between the second and third sections. The sealing member in this embodiment includes a radially inward flange to fit within the undercut formed by the radial step on the gland when the gland is threaded onto the collar.

In a more specific aspect of the second embodiment, the seal will include essentially cylindrical inner and outer surfaces and a sealing end face which is essentially annular and flat.

In a third embodiment of the invention, the retainer gland and sealing member may be configured essentially as described in connection with the second embodiment, but the retainer gland may be threaded directly into an annular opening of a valve body, rather than into a collar member which is fitted into the valve body.

In the first three embodiments, the seal is preferably formed of tetraflouroethylene, sold under the tradename Teflon. Other alternative materials may, of course, be substituted. In another alternative aspect of the invention, the seal may be comprised of a metal component and an annular resilient sealing component. The metallic component should be comprised of a material suitable for sealing, such as a soft metal. Examples of suitable metals are 304 stainless steel and bronze. This metallic component will include an annular, channel-shaped groove in the sealing face, into which the annular resilient sealing component is positioned such that an end portion of the second component extends outwardly of the metallic component for engagement with a valve element. Optionally, but preferably, the interior side walls of the groove on the metallic component include reverse threads. Likewise, the exterior walls of the resilient seal component include complementary threads for securing the seal in place during use, but providing a means of removing the resilient component after it experiences wear.

Accordingly, the present invention provides several advantages over the prior art seals. For example, the seal element in all of the embodiments of the present invention will be positively held in position during use to minimize its dislodging, but the seal member may be removed after wear so that only a seal element need be replaced. Therefore, the invention provides a seal assembly which will result in economic savings over those assemblies which require replacement of the seal as well as replacement of the seal retainer.

Additionally, the embodiment of this invention which includes the retainer cap is particularly suited for use in mid-range to high-range pressure operations. In this embodiment, the threads on the retainer cap and the collar are not exposed to the flowing fluids which could cause corrosion or deterioration of the threads. Moreover, the interior surface on the collar is continuous and uninterrupted, thereby eliminating a path through which the pressurized fluids might otherwise escape.

Additionally, the embodiment which includes the metallic seal component and the resilient seal component provide a highly effective arrangement for sealing the escape of pressurized fluids or gases under extremely high pressures.

These and other meritorious features and advantages will be more fully appreciated from the following detailed description of the invention and the appended claims.

BRIEF DESCRIPTION OF THE DRAWINGS

FIG. 6 is an enlarged, cross-sectional view of the gate valve shown in FIG. 3 into which is assembled an embodiment of the invention which includes a seal member suited for high pressures similar to the seal shown in FIG. 5, the seal member including separate metallic and resilient sealing components.

DETAILED DESCRIPTION OF THE PREFERRED EMBODIMENTS

Figure 1:
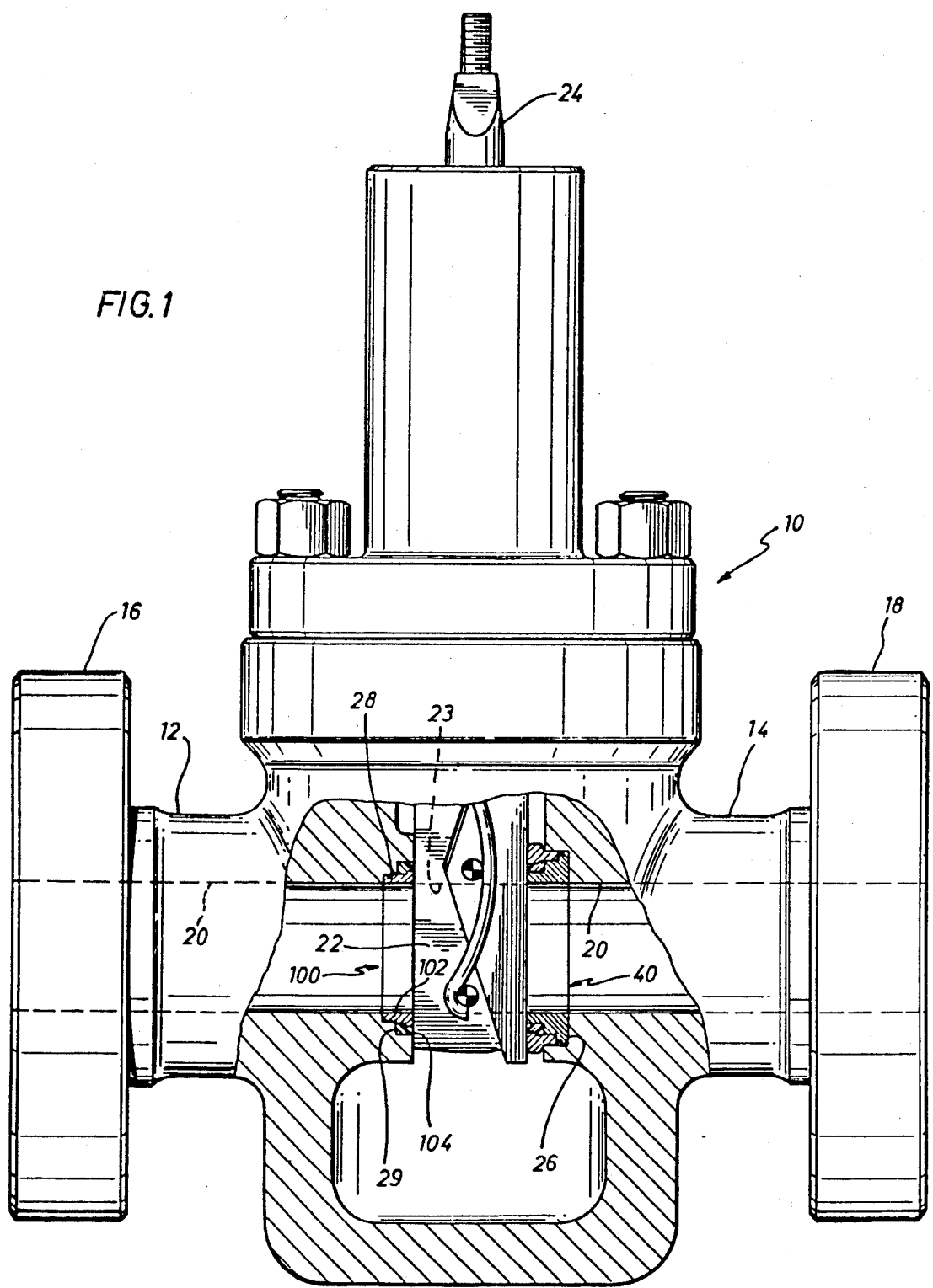
FIG. 1 is a partial sectional, side view of a gate valve, in which are assembled two different sealing assemblies of the present invention.

FIG. 1 illustrates a gate valve 10 in accordance with the present invention, which will accommodate the use of the seal assemblies disclosed herein. Examples of a typical gate valve are shown in U.S. Pat. Nos. 3,929,316, 4,116,419 and 3,006,601, which are incorporated herein by reference for the purpose of setting forth details of the valve construction.

In general, the gate valve 10 includes a pair of branch lines 12 and 14 that will be suitably secured to a pipeline by flanges 16 and 18. A flow line 20 extends through the branch lines 12 and 14, the flanges 16 and 18, and the central portion of the valve. A vertically displaceable gate element 22 includes a circular opening 23 that accommodates flow of fluids through the valve 10 when the gate is positioned as illustrated in FIG. 1. The gate element 22 may be displaced by a stem assembly 24, as is conventional in the art.

Figure 2:
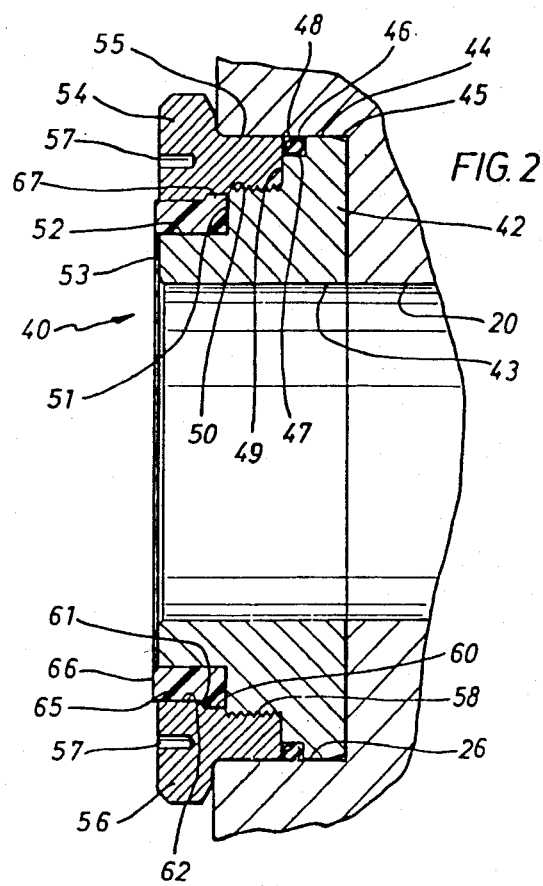
FIG. 2 is an enlarged, cross sectional view illustrating one embodiment of the invention which includes a retainer cap threaded exteriorly onto a valve collar.

On the right side of the gate element 22, as viewed in FIG. 1, the valve body 10 includes an annular recess 26 to receive a sealing ring assembly of one embodiment 40 of the invention, which is shown in greater detail in FIG. 2. On the left side of the gate element 22, the valve body 10 includes a female threaded section 28 and a counterbore annular recess 29 around flow passageway 20 to receive another embodiment 100, which is shown in greater detail in FIG. 4.

Referring now more particularly to FIG. 2, seal assembly 40 is illustrated as including a valve seat body or collar 42 and a retainer cap 54. In this embodiment, as well as in the following embodiments, the valve seat body and retainer cap or retainer gland may be comprised of stainless steel, carbon steel or any other suitable material.

The valve seat body 42 includes an essentially cylindrical inner, uninterrupted surface 43 having an interior diameter essentially the same as the diameter of the flow passageway 20. The outer diameter of the valve seat body 42 includes an essentially cylindrical section 44, that may optionally include a beveled portion 45 to facilitate the insertion of the collar into the annular recess 26. The outer diameter of cylindrical section 44 is essentially the same as the diameter of the annular recess 26 to facilitate the collar 42 being secured in the valve body, preferably by press fitting.

Also on the exterior surface of the collar 42 are an annular step-face 46 and another essentially cylindrical surface 47. As illustrated, these two surfaces cooperate with an end face of the retainer cap 54 to define a recess around the exterior of the collar 42 to hold an optional, but preferable, O-ring 48 in position for secondary sealing purposes. Another annular step-face 49 extends from cylindrical section 47 to another essentially cylindrical section 50, which is threaded to receive complementary threads on retainer cap 54. As illustrated, the outer diameter of cylindrical, threaded section 50 is less than that of cylindrical section 44.

Another annular step face 51 extends radially inward from section 50 to another essentially cylindrical outer section 52, which likewise has a lesser outer diameter than that of either sections 50 or 44. An outer surface 53 on the collar faces toward the gate valve element 22 when the valve seat body is inserted in the valve body for use, serving as an auxialiary seal face, secondary to the seal face provided by a resilient sealing component 65.

The retainer cap 54 includes an exterior essentially cylindrical surface 55, which preferably has an outer diameter slightly less than that of the diameter of annular recess 26 in the valve body so that the retainer cap may be threaded onto or off of the valve seat body without difficulty. An optional, but preferable, peripheral flange 56 is designed to seat against the outer opening of the annular recess 26. A plurality, preferably four, axial openings 57 are provided in the retainer cap to receive a spanner wrench to facilitate the threading of the retainer cap onto or off of the valve seat body.

On the interior surface of the retainer cap is a threaded, essentially cylindrical section 58 designed for threading onto section 50 of the valve seat body. Another essentially cylindrical section 60, which may be a continuation of cylindrical threaded section 58, extends to an annular step-face 61. Another essentially cylindrical section 62 extends from the annular step-face 61 to a front face on the retainer cap. The annular step-face 61 provides an undercut or shoulder for retaining a seal element 65 in position. As illustrated, the section 62 is radially spaced from a portion of section 52 on the collar 42 by a distance which should very closely approximate the radial width of sealing element 65.

The seal element 65 is preferably resilient and comprised of any material providing desirable sealing characteristics, such as hard rubber, nylon, and most preferably tetraflouroethylene, which is sold under the trade name Teflon. Seal 65 is axially dimensioned so that a forward annular, flat sealing face 66 protrudes from face 53 of the collar to engage gate element 22. At the opposed end of the seal 65, a peripheral flange 67 is provided to fit within the undercut formed by annular step-face or shoulder 61 on the retainer cap 54.

The embodiment of FIG. 2 is particularly suited for mid-range to high-range pressures in the fluid flow stream, by virtue of there being no interruption in the interior surface 43 of the collar 42. That is, the threads on the collar and retainer cap are exterior to the pressurized flow path 20. Additionally, by the arrangement of the peripheral flange 67 on the seal element 65 and the complementary-shaped undercut formed by the annular step-face 61 on the retainer cap, the seal element will be positively held in position to prevent it from becoming dislodged during movement of the gate element 22. Further, the seal element 65 may be removed and replaced without difficulty by the removal of the retainer cap 54.

Figure 3:
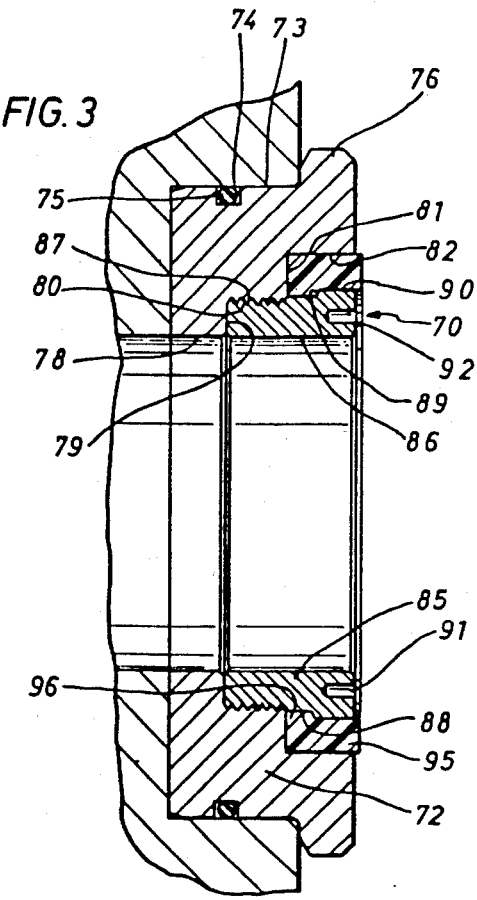
FIG. 3 is an enlarged, cross sectional view of another embodiment of the invention which includes a retainer gland threaded interiorly into a valve collar.

FIG. 3 illustrates another embodiment which is suited particularly for low pressure fluids flowing through the valve 10. This assembly 70 includes an exterior valve seat body or collar 72, an interior retainer gland 85 and a resilient seal 95.

The collar 72 includes an essentially cylindrical outer surface 73 that may optionally, but preferably, include a peripheral, channel-shaped groove 74 to receive an O-ring 75. The surface 73 is dimensioned such that it will be received within an annular recess, such as that shown by reference 26 in FIG. 1, preferably by press fitting. A peripheral flange 76 adjacent a forward face 77 on the collar will seat against the opening of the annular recess in the valve body, in the same manner as the peripheral flange 56 on retainer cap 54 in the embodiment of FIG. 2.

The interior surface of the collar 72 includes an essentially cylindrical section 78 having an inner diameter substantially the same as the diameter of flow path 20 in the valve body 10. An annular step face 79 extends from the interior face 78 to another essentially cylindrical section 80, which is threaded to receive the retainer gland 85. A second annular step-face 81 extends from the threaded section 80 to another essentially cylindrical interior surface 82 having a dimension closely approximating the outer diameter of resilient seal element 95.

The retainer gland 85 also includes an interior, essentially cylindrical surface 86 that likewise has an inner diameter essentially the same as section 78 on the collar 72 and the flow path 20 in valve body 10. The exterior surface of the gland includes an essentially cylindrical, threaded section 87 designed to be received on the threaded section 80 of the collar 72. Adjacent threaded section 87 is an unthreaded essentially cylindrical section 88, that will preferably merely be an extension of section 87. An annular step face 89 extends from section 88 to another essentially cylindrical section 90, that is radially inward of section 82 on the collar, thereby providing a space which is substantially the same as the radial width of resilient seal element 95. A plurality of axial openings 91, preferably four, are provided in a front face 92 of the retainer gland for receiving a spanner wrench to facilitate the threading of the retainer gland into or out of the valve seat body 72.

The resilient seal element 95 is essentially identical to the seal element 65 illustrated and discussed in the embodiment of FIG. 2, with the exception that the radial flange 96 is directed inwardly to fit within the undercut pocket formed by the annular step-face 89 on the retainer gland 85.

Figure 4:
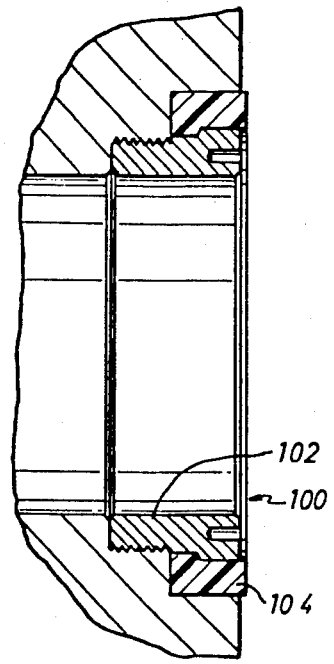
FIG. 4 is an enlarged, cross sectional view of another embodiment which includes a retainer gland similar to that shown in FIG. 3, but which is suited to be threaded directly into the valve body.

FIG. 4 illustrates another embodiment 100 which includes a retainer gland 102 and a resilient seal element 104. This embodiment is shown on the left side of gate element 22 in FIG. 1, wherein the retainer gland 102 threads directly into threads 28 provided in the valve body 10 and seal element 104 fits within recess 29. In this embodiment, a separate valve seat body can be eliminated. Since the retainer gland 102 and resilient seal element 104 may be identical to the retainer gland 85 and seal element 95 illustrated and discussed in connection with the embodiment of FIG. 3, the detailed description of these components will not be reiterated for purposes of conciseness.

Figure 5:
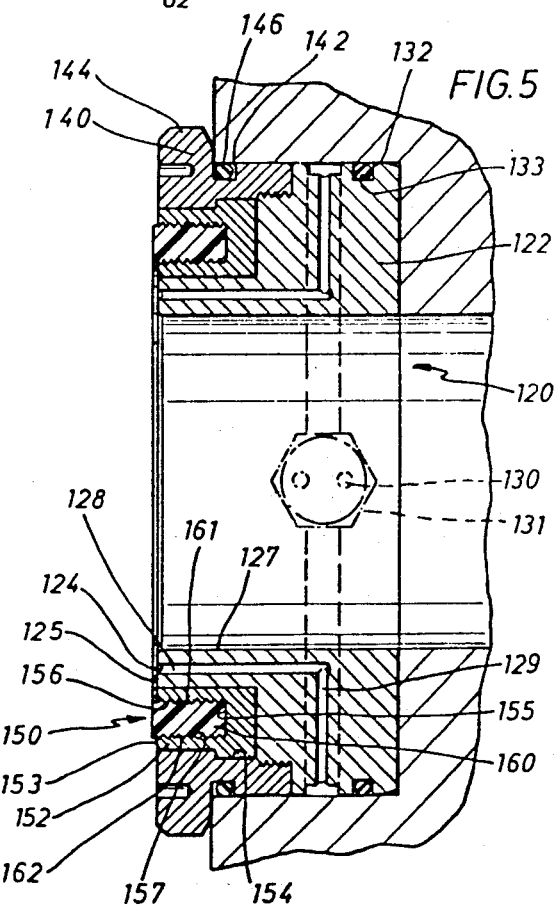
FIG. 5 is a partial cross sectional view of a gate valve into which is assembled the embodiment of the invention which includes a seal suited for extremely high pressures, this embodiment including separate metallic and resilient sealing components.

FIG. 5 illustrates another embodiment which is particularly suited for use in extremely high pressure operations. In this embodiment, the seal assembly 120 includes an interior valve seat body or collar 122, an exterior retainer cap 140 and a seal component 150. The valve seat body 122 and retainer cap 140 may be identical to the corresponding components of the embodiment shown in FIG. 2, with a few exceptions. For example, the collar 122 includes an annular half-round groove 124 on its forward face 125 between the seal component 150 and the interior surface 127. A plurality of axial bores 128 extend from the annular groove 124 to a corresponding number of radial bores 129. These radial bores 129 communicate with openings 130 in the valve body, with each of the bores 130 extending to a grease fitting 131. Sealant material may be injected through these fittings into the valve seat assembly and into the annular groove 124 to serve as a secondary sealant.

The collar 122 will preferably include an annular channel-shaped groove 132 to receive an O-ring 133. Likewise, an annular groove 142 may preferably be provided adjacent the forward peripheral flange 144 to receive another sealing O-ring 146.

Other than these additions and modifications, the collar 122 and retainer cap 140 are similar to the corresponding components illustrated and discussed in connection with the embodiment of FIG. 2.

The seal component 150 includes a metallic component 152 and a resilient element 160. The metallic component is preferably formed of a relatively soft material, such as 304 stainless steel or bronze, in order to provide a sealing function. The element 152 is essentially annular and includes a front sealing face 153 and a peripheral flange 154 which is similar in function to the flange 67 discussed in connection with the seal component 65 of FIG. 2. A channel-shaped annular groove 155 is provided in the front sealing face 153 of the metallic component to receive the resilient seal 160. Preferably, but optionally, the groove 155 will include reverse threads 156 and 157 which are complementary to threads 161 and 162 on the side faces of the resilient seal component 160. With this arrangement, the resilient seal may be threaded into and out of the metallic component 152, so that only the resilient element may be replaced after experiencing wear. As in the other embodiments, the resilient component is preferably formed of tetraflouroethylene or any other suitable resilient sealing component. The axial dimension of the resilient seal 160 is such that it will protrude slightly, for example on the order of 0.030 inches, from the front face 153 of component 152 for engagement with the movable gate element 22 of the valve.

FIG. 6 illustrates an embodiment which includes an exterior valve seat body or collar 72 and an interior retainer gland 85 which are essentially identical in function and shape to the collar 72 and retainer gland 85 as shown and described in the embodiment of FIG. 3. The embodiment shown in FIG. 6 further includes a seal component 150 essentially identical to the seal component 150 illustrated and discussed in the embodiment of FIG. 5, with the exception that the peripheral flange 154 of the metallic component 152 is directed inwardly to fit within the undercut pocket formed by the annular stepface 89 on the retainer gland 85. Accordingly, FIG. 6 illustrates an alternative embodiment incorporating the metallic seal component 150 of FIG. 5 into the assembly of FIG. 3.

It will be apparent to those skilled in the art that various modifications may be made to the disclosed embodiments without departing from the spirit and scope of the invention. For example, the specific configuration of the interlocking portions of the resilient seal element and the shoulder on the retainer cap or retainer gland might be modified. Also, various materials might be used for the resilient seal component or the metallic seal component of the embodiment of FIG. 5. Modifications might also be made to the specific valve structure disclosed.

Having therefore completely and sufficiently disclosed my invention, I now claim:

1. A seal assembly for use in a valve, comprising:
    an annular collar having an essentially cylindrical outer surface section suited for fitting into an annular recess in a valve body, and an inner surface including (a) a first essentially cylindrical section, (b) a second essentially cylindrical section having an inner diameter greater than that of the first section and having threads thereon, (c) a third essentially cylindrical section having an inner diameter greater than that of the second section, and (d) an essentially radial, annular surface interconnecting said second and third sections;
    an annular retainer gland having an essentially cylindrical inner surface with substantially the same diameter as that of the first section of the collar and an outer surface having (a) a first section threaded complementary to the second collar section to accommodate the gland being threaded into the collar, (b) a second, essentially cylindrical section adjacent said threaded section, (c) a third, essentially cylindrical section radially spaced from and facing the third section of the collar when the gland is threaded into the collar, and (d) a radial outward, annular step between the second and third sections thereof; and
    an essentially annular sealing member for placement between the collar and the gland and including an end face suited for engagement with a valve element and a radially inward flange at the opposite end thereof from said end face to fit within the undercut formed by the radial step on the gland when the gland is threaded onto the collar.

2. The assembly as defined in claim 1, wherein the annular sealing member includes essentially cylindrical inner and outer surfaces and wherein said end face is essentially annular and flat.

3. The assembly as defined in claim 1 wherein the seal is comprised of a metal suited for use as a sealing element and includes an annular, channel-shaped groove in said end face thereof, and further including an annular, resilient sealing component within said groove and having an end portion thereof extending out of the groove for engagement with a valve element.

4. The assembly as defined in claim 3, characterized by the metallic seal component being comprised of a metal selected from the group consisting of 304 stainless steel or bronze.

5. The assembly as defined in claim 4, characterized by the resilient seal component being comprised of tetraflouroethylene.

6. The assembly as defined in claim 3, wherein the interior side walls of the channel-shaped groove include threads and the exterior walls of the resilient seal component include threads complementary to the threads on the groove walls.

7. A valve and seal assembly, comprising:
    a valve having a flow passageway therethrough and a gate member for alternatively shutting off flow or accommodating flow through the passageway;
    the passageway including an annular recess on each side of the gate member;
    a seal assembly in the valve recess for engaging the gate member, at least one of the seal assemblies including:
    an annular collar having an essentially cylindrical outer surface section fitting into the annular recess in the valve, and an inner surface including (a) a first essentially cylindrical section, (b) a second essentially cylindrical section having an inner diameter greater than that of the first section and having threads thereon, (c) a third essentially cylindrical section having an inner diameter greater than that of the second section, and (d) an essentially radial, annular surface interconnecting said second and third sections;

an annular retainer gland having an essentially cylindrical inner surface with substantially the same diameter as that of the first section of the collar and an outer surface having (a) a first section threaded complementary to the second collar section to accommodate the gland being threaded into the collar, (b) a second, essentially cylindrical section adjacent said threaded section, (c) a third, essentially cylindrical section radially spaced from and facing the third section of the collar when the gland is threaded into the collar, and (d) a radial outward, annular step between the second and third sections thereof; and an essentially annular sealing member positioned between the collar and the gland and including an end face in engagement with the gate member of the a valve and a radially inward flange at the opposite end thereof from said end face to fit within the undercut formed by the radial step on the gland when the gland is threaded onto the collar.

* * * * *